(12) United States Patent
Rotulo et al.

(10) Patent No.: US 10,984,927 B2
(45) Date of Patent: Apr. 20, 2021

(54) PTC THERMISTOR SWITCH FOR ELECTRIC MOTORS

(71) Applicant: ELECTRICA S.r.l., Milan (IT)

(72) Inventors: Fabrizio Rotulo, Naples (IT); Pietro Cecconi, Milan (IT)

(73) Assignee: ELECTRICA S.R.L., Milan (IT)

( * ) Notice: Subject to any disclaimer, the term of this patent is extended or adjusted under 35 U.S.C. 154(b) by 0 days.

(21) Appl. No.: 16/863,734

(22) Filed: Apr. 30, 2020

(65) Prior Publication Data

US 2020/0350103 A1 Nov. 5, 2020

(30) Foreign Application Priority Data

May 3, 2019 (IT) .......................... 102019000006529

(51) Int. Cl.
| | |
|---|---|
| *H01C 7/02* | (2006.01) |
| *H01C 1/02* | (2006.01) |
| *H01C 1/14* | (2006.01) |
| *H02K 11/25* | (2016.01) |

(52) U.S. Cl.
CPC ............... *H01C 7/02* (2013.01); *H01C 1/02* (2013.01); *H01C 1/1406* (2013.01); *H02K 11/25* (2016.01)

(58) Field of Classification Search
CPC .......... H01C 7/02; H01C 1/02; H01C 1/1406; H02K 11/25
See application file for complete search history.

(56) References Cited

U.S. PATENT DOCUMENTS

| | | | | |
|---|---|---|---|---|
| 5,606,302 A | * | 2/1997 | Ichida | ............... H01C 1/1406 338/203 |
| 5,760,676 A | * | 6/1998 | Yamada | ............... H01C 1/1406 337/183 |
| 5,963,125 A | * | 10/1999 | Mochida | ............... H01C 1/024 338/234 |

(Continued)

FOREIGN PATENT DOCUMENTS

| | | |
|---|---|---|
| DE | 19824781 A1 | 12/1999 |
| EP | 1511053 A2 | 3/2005 |

(Continued)

OTHER PUBLICATIONS

IT Search Report dated Jan. 13, 2020 re: Application No. 102019000006529, pp. 1-8, citing: U.S. Pat. No. 6,160,473 A, EP 1 511 053 A2, DE 198 24 781 A1, JP H04 78103 A, U.S. Pat. No. 5,760,676 A and JP H04 78104 A.

*Primary Examiner* — Kyung S Lee
(74) *Attorney, Agent, or Firm* — Cantor Colburn LLP

(57) ABSTRACT

A PTC thermistor switch for electric motors includes an insulating casing and a PTC thermistor housed in a housing seat made in the insulating casing. The PTC thermistor has a first face and a second face opposite the first face. A first electric terminal is housed in the insulating casing and has two protrusions in direct contact with the first face of the PTC thermistor in two opposite contact points with respect to the center of the first face. The switch also includes a second electric terminal housed in the insulating casing and an elastic arm portion in direct contact with the second face of the PTC thermistor in an intermediate contact point between the contact points of the protrusions. The second electric terminal is arranged so that the elastic arm portion presses against the second face of the PTC thermistor.

6 Claims, 3 Drawing Sheets

(56) References Cited

U.S. PATENT DOCUMENTS

| | | | | |
|---|---|---|---|---|
| 6,160,473 | A * | 12/2000 | Gruhn | H01C 1/1406 338/22 R |
| 6,172,593 | B1 * | 1/2001 | Mochida | H01C 1/024 338/22 R |
| 6,407,659 | B2 * | 6/2002 | Mochida | H01C 1/1406 338/22 R |
| 7,245,198 | B2 * | 7/2007 | Ozawa | H01C 1/022 338/22 R |
| 8,174,354 | B2 | 5/2012 | Cohen et al. | |
| 9,431,821 | B2 * | 8/2016 | Chen | H01C 1/014 |
| 2012/0019348 | A1 * | 1/2012 | Cohen | H01C 1/1406 337/416 |

FOREIGN PATENT DOCUMENTS

| | | |
|---|---|---|
| EP | 2674949 A1 | 12/2013 |
| JP | H0478103 A | 3/1992 |
| JP | H0478104 A | 3/1992 |

\* cited by examiner

# PTC THERMISTOR SWITCH FOR ELECTRIC MOTORS

CROSS-REFERENCE TO RELATED APPLICATIONS

This application is related to, and claims the benefit of, Italian patent application No. 102019000006529, filed on May 3, 2019, the contents of which are hereby incorporated by reference in their entirety.

TECHNICAL FIELD

The present disclosure relates to a PTC thermistor switch for electric motors.

BACKGROUND

As it is known, single-phase asynchronous AC electric motors require the presence of an auxiliary winding in order to generate the starting torque required for starting, called starting winding, in addition to a primary winding, the auxiliary winding being capable of providing the necessary phase shift between said auxiliary winding and the main one. Once the electric motor is started, the auxiliary winding is normally disconnected via a switch.

Most hermetic compressors in the field of refrigeration use a single-phase asynchronous AC electric motor provided with auxiliary winding; generally, in these cases the function of disconnecting the auxiliary winding is assigned to a PTC thermistor switch (Positive Temperature Coefficient).

This PTC thermistor switch is usually placed in series with the auxiliary winding and in a very short time, normally less than 2 sec, but in any case sufficient for the compressor to start, owing to the self-heating due to the electric current passing through it, it reaches the Curie temperature at which its electrical resistance increases by many orders of magnitude, practically interrupting the electrical circuit, except for a small residual current of a few mAs, and substantially disconnecting the auxiliary winding. The PTC switch generally comprises an insulating casing in which a PTC thermistor is housed in electrical contact with electric terminals.

It is possible, especially at the end of its useful life, that the PTC thermistor enters a state commonly called "thermal runaway" in which its electrical resistance tends to decrease, thereby increasing its temperature uncontrollably and causing the breakage due to the fracture of the same thermistor. In this case, if the fractured parts continue to be powered because of the contact with the electric terminals, very high temperatures and possible electric arcs are generated which seriously damage the surrounding parts normally made of plastic and pose a serious safety problem.

For this reason, it is increasingly required that PTC thermistor switches for starting windings are constructed in such a way as to guarantee the interruption of the power supply in case of breakage in order to obtain a "fail safe" device.

For this purpose, PTC thermistor switches are known in which the PTC thermistor is partially held in place by support elements made of electrically insulating material, generally made of plastic, positioned in such a way as to allow the separation of the fractured parts of the PTC thermistor in case of breakage. Due to the normal high operating temperature of the PTC thermistor which can reach up to 200° C. on the faces, it is necessary that the support elements are made of special plastics, even very expensive ones, capable of not melting at those temperatures. This results in high costs for the PTC thermistor switch.

Switches are also known, such as for example those described in EP2674949 in which the PTC thermistor is supported on one side by a first electric terminal, and on the opposite side by a second electric terminal and by an elastic support element. In this way, in case of breakage of the PTC thermistor, the elastic support element moves away from the second electric terminal, actually opening the switch. In this configuration, the use of a further elastic support element in addition to the electric terminals can entail an increase in costs and a certain complexity of assembly.

Furthermore, switches are also known, such as for example those described in U.S. Pat. No. 8,174,354, in which the PTC thermistor is supported on one side by two elastic electric terminals, and on the opposite side by an electric strut terminal located at the center of the PTC thermistor alongside which, in a symmetrical position, other abutment elements can also be provided. In this case, assuming that the breakage of the PTC thermistor occurs mainly in a symmetrical way with respect to the center, the thrusts exerted by the elastic electric terminals cause the rotation of the fragments by moving them away from the electrical strut terminal, actually opening the switch. However, the behaviour in case of asymmetrical breakage or fragment generation that may still remain in contact with the electric terminals remains uncertain.

SUMMARY

The present disclosure overcomes the above mentioned drawbacks and in particular to devise a PTC thermistor switch for electric motors which guarantees the interruption of the electrical circuit to which it is applied in case of any type of breakage and/or fragmentation of the PTC thermistor and which at the same time is economical to produce.

This and other advantages according to the present disclosure are achieved by providing a PTC thermistor switch for electric motors as explained in claim 1.

Further characteristics of the PTC thermistor switch for electric motors are the subject of the dependent claims.

BRIEF DESCRIPTION OF THE DRAWINGS

The features and advantages of a PTC thermistor switch for electric motors according to the present disclosure will be more apparent from the following description, which is to be understood as exemplifying and not limiting, with reference to the schematic attached drawings, wherein.

DETAILED DESCRIPTION OF THE DRAWINGS

With reference to the figures, a PTC thermistor switch for electric motors is shown, indicated as a whole with 10.

This PTC thermistor switch 10 comprises an insulating casing 20 defining an internal volume. The insulating casing 20 can for example be made of two pieces juxtaposed one on the other and joined together, for example by means of screws or glue or by interlock coupling between tabs made on one piece and respective seats made on the other piece.

The PTC thermistor switch 10 comprises a PTC thermistor 11 housed in the insulating casing 20 and having a first face 11' and a second face 11" opposite to the first face 11'.

Figure 1:
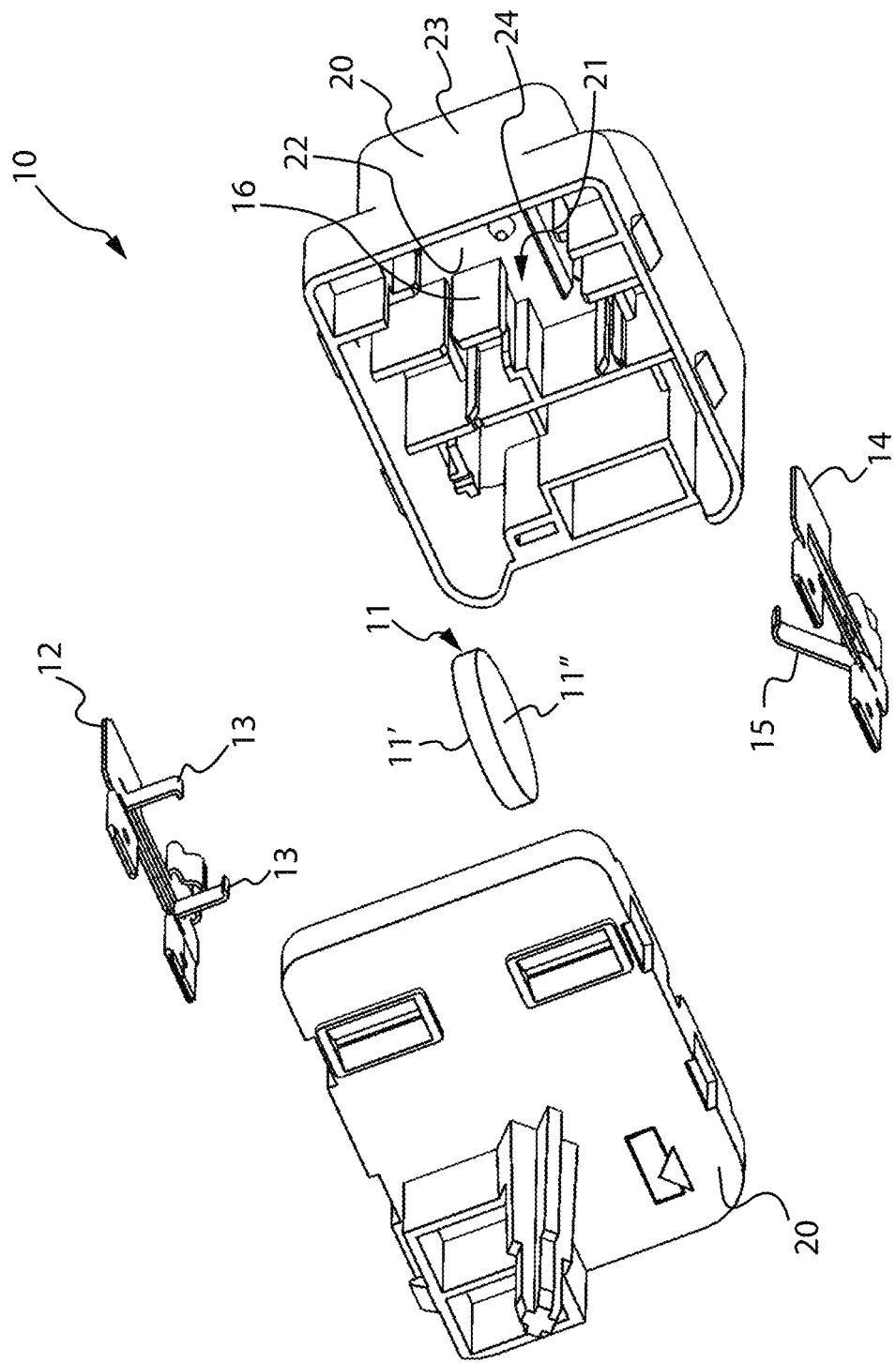
FIG. 1 is an exploded view of a PTC thermistor switch according to the present disclosure.

The PTC thermistor 11 can for example be made in the form of a disc as illustrated in FIG. 1. The first face 11' and the second face 11" of the PTC thermistor 11 are the electrodes of the PTC thermistor 11.

The PTC thermistor 11 is housed in a housing seat 21 made in the insulating casing 20.

The PTC thermistor switch 10 further comprises a first electric terminal 12 housed in the insulating casing 20 and having two protrusions 13 in direct contact with the first face 11' of the PTC thermistor 11 in two opposite contact points with respect to the center of the first face 11'.

The PTC thermistor switch 10 also comprises a second electric terminal 14 housed in the insulating casing 20 and having an elastic arm portion 15 in direct contact with the second face 11" of the PTC thermistor 11 in an intermediate contact point between the contact points of the protrusions 13; said second electric terminal 14 is advantageously arranged so that the elastic arm portion 15 presses against the second face 11" of the PTC thermistor 11.

In particular, the first electric terminal 12 and the second electric terminal 14 are housed in the insulating casing 20 in respective opposite seats with respect to the housing seat of the PTC thermistor 11. The first electric terminal 12 can be, for example, made from a plate element from which the two protrusions 13 depart, like in the embodiment illustrated in FIG. 1.

Similarly, the second electric terminal 14 can be made, for example, from a plate element from which the elastic arm portion 15 departs, like in the embodiment illustrated in FIG. 1.

When the PTC thermistor switch 10 is assembled, the PTC thermistor 11 is kept in position between the protrusions 13 and the elastic arm portion 15 thanks to the thrust action of the elastic arm element 15. In particular, as can be seen in the appended figures, when the PTC thermistor 11 is in position, it does not touch further support elements apart from the protrusions 13 and the elastic arm portion 15. These further support elements should necessarily be made of materials capable of withstanding the normal operating temperatures of the PTC thermistor 11, for example of metal or expensive plastics which are capable of not melting at the aforesaid temperatures. The absence of these further support elements makes the production and assembly of the PTC thermistor switch simple and contributes to keeping the cost of the switch low compared to those of the prior art.

The elastic arm portion 15 can assume a rest position in which it is completely extended and a multitude of working positions in which it is contracted and tends to return elastically to the rest position.

The elastic arm portion 15, after assembly completion and during normal operation of the switch, is not in the rest position but is contracted in such a way as to be able to exert on the second face 11" of the PTC thermistor 11 the pressure necessary to keep the PTC thermistor 11 stably in position.

Preferably, the protrusions 13 of the first electric terminal 12 extend in length along a longitudinal direction X substantially perpendicular to the first face 11' of the PTC thermistor 11.

Preferably, the PTC thermistor switch 10 comprises within the insulating casing 20 an abutment element 16 placed between the protrusions 13 in a proximal position with respect to one of the protrusions 13 at a determinate distance from the first face 11' of the PTC thermistor 11. This abutment element 16 can be made, for example, by means of an internal wall such as the one shown in FIGS. 2A-2D, or by means of a pillar.

Preferably, the distance between the abutment element 16 and the elastic arm portion 15 in the rest position is less than or equal to the thickness of the PTC thermistor 11.

Preferably, the contact points of the protrusions 13 with the first face 11' of the PTC thermistor 11 are substantially symmetrical with respect to the center of the first face 11'.

Preferably, the protrusions 13 are at the same distance from a bottom wall 22 of the insulating casing 20 parallel to them.

The housing seat 21 has a collection area 25 intended for collecting the falling fragments of the PTC thermistor 11 in case of breakage or crushing of the latter.

Preferably, the insulating casing 20 presents an insulating protective wall 24 which extends into the collection area 25 so as to cover the portion of the second electric terminal 14 facing this collection area 25.

The operation of the PTC thermistor switch 10 is as follows.

Figure 2A:
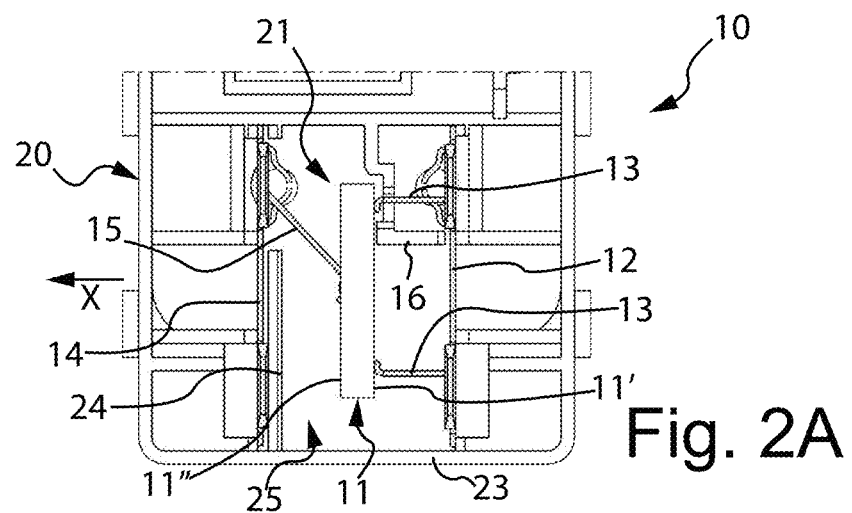
FIG. 2A is a section view of the PTC thermistor switch of FIG. 1 assembled and in operating configuration.

Let's consider the PTC thermistor switch 10 completely assembled like in FIG. 2A.

During normal operation, the electric current flows between the two electric terminals 12 and 14 through the PTC thermistor 11. In particular, during normal operation the PTC thermistor switch 10 is positioned like in FIG. 2A; in this configuration, the PTC thermistor 11 the protrusions 13 and the elastic arm portion 15 keep the PTC thermistor 11 suspended, avoiding that the latter falls by gravity downwards, that is towards a lower wall 23 of the insulating casing 20.

Therefore, the terms "lower", "upper" refer hereinafter to the position that the components assume in the operating configuration of the PTC thermistor switch.

Figure 2B:
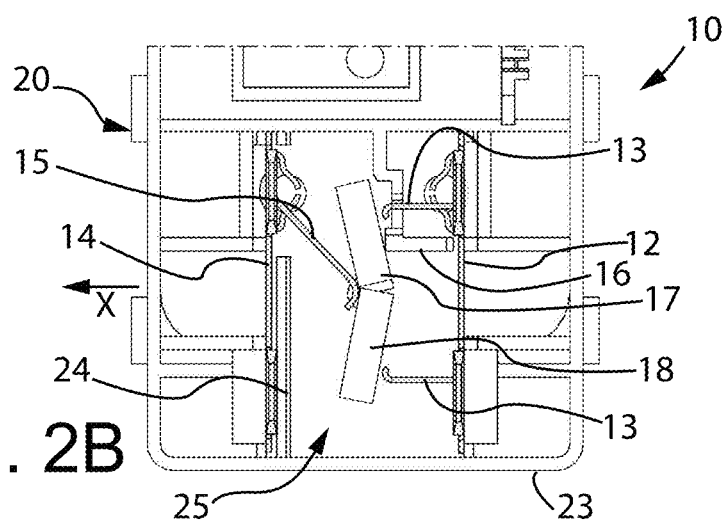
FIGS. 2B-2D are three section views of the PTC thermistor switch of FIG. 2A in three phases following a breakage of the PTC thermistor.
Figure 2C:
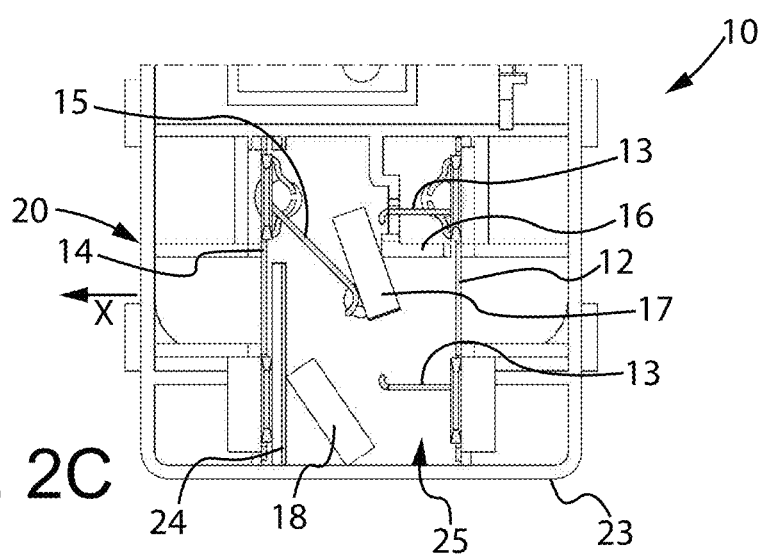
Figure 2D:
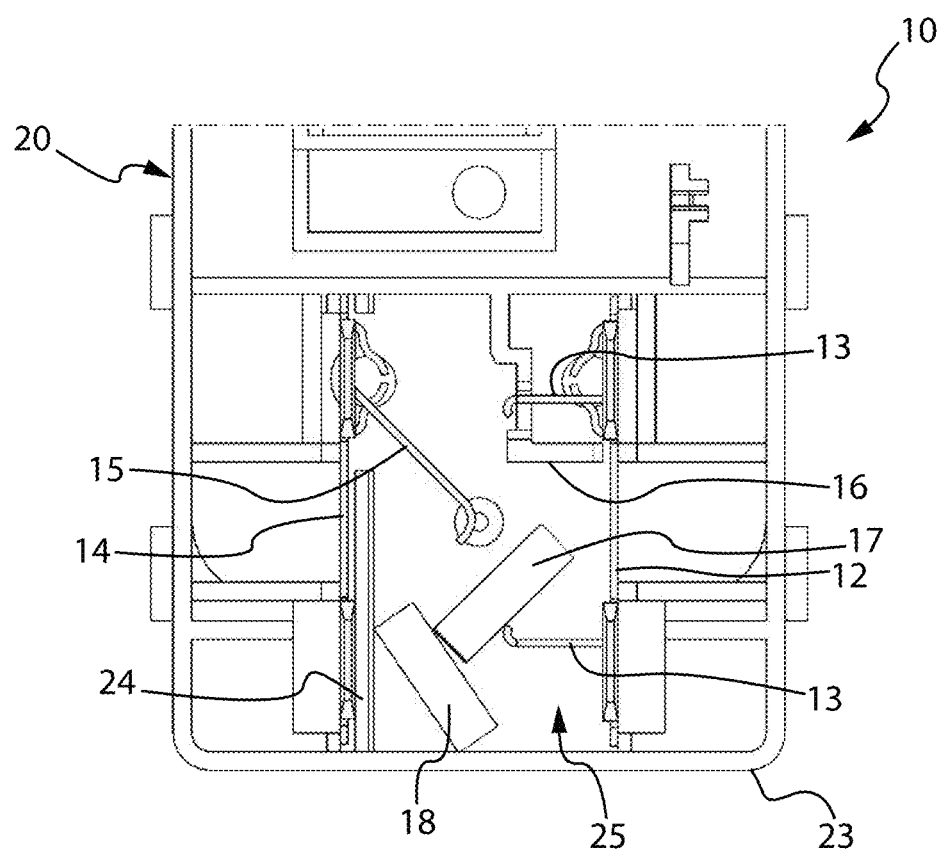

In case of breakage of the PTC thermistor 11 into two fragments 17, 18, as visible in FIG. 2B, the elastic arm portion 15 moves and go to the rest position causing the rotation and subsequent separation of the two fragments 17, 18. After separation, the fragments 17, 18 fall by gravity into the lower collection area of the housing seat 21. In this way, there is no longer electrical contact between the electric terminals 12, 14.

The presence of the insulating protective wall 24 prevents the fragments collected in the collection area from coming into direct contact with the second electric terminal 14 thus preventing the potential formation of an electrical path between the two electric terminals 12, 14 which exploits the fallen fragments of the PTC thermistor 11.

The abutment element 16 ensures a rapid separation between the fragments 17, 18 as it causes a rapid rotation of the upper fragment 17, especially when the breakage occurs along a break line placed between the level of the abutment element 16 and the lower protrusion 13.

If the distance between the abutment element 16 and the elastic arm portion 15 in the rest position is less than or equal to the thickness of the PTC thermistor 11, the upper fragment 17 after being pushed into rotation can be retained even only for a few seconds between the elastic arm portion 16 and the abutment element 16. In this way, the separation between the fragments 17, 18 is ensured.

In case of progressive crushing of the PTC thermistor 11 the fragments fall into the collection area 25 substantially without encountering any obstacles.

From the above description the features of the PTC thermistor switch of the present disclosure, as well as the advantages thereof, are evident.

In fact, according to the present disclosure, thanks to the action of the two protrusions of the first electric terminal on one side and of the elastic arm portion of the second electric terminal, the PTC thermistor is not only kept in a suspended position and in electrical conduction but, in case of breakage of the PTC thermistor, the separation of the fragments and consequent opening of the switch is ensured.

These effects are achieved thanks to the particular configuration of the electric terminals; the switch is therefore very simple and inexpensive to manufacture and assemble as it does not require further components other than those strictly necessary for electrical operation, i.e. the electric terminals and the PTC thermistor. In fact, for example, as previously written, further support elements in addition to the protrusions and the elastic arm portion which would entail an increase in costs are not provided.

The housing seat of the PTC thermistor, then, is provided with a single abutment element and therefore offers the fragments of the PTC thermistor the possibility of a substantially hindrance-free fall in the collection area.

Finally, it is to be understood that the PTC thermistor switch as conceived herein is susceptible to many modifications and variations, all falling within the disclosure; furthermore, all the details are replaceable by technically equivalent elements. In practice, the materials used, as well as the dimensions thereof, can be of any type according to the technical requirements.

The invention claimed is:

1. A PTC thermistor switch for electric motors comprising:
   an insulating casing;
   a PTC thermistor housed in a housing seat made in said insulating casing, said PTC thermistor having a first face and a second face opposite to the first face;
   a first electric terminal housed in said insulating casing and having a unitary construction with two protrusions in direct contact with said first face of said PTC thermistor in two opposite contact points with respect to the center of said first face, wherein said protrusions of said first electric terminal extend in length along a longitudinal direction X substantially perpendicular to said first face of said PTC thermistor;
   a second electric terminal housed in said insulating casing and having a unitary construction with an elastic arm portion in direct contact with said second face of said PTC thermistor in an intermediate contact point between the contact points of said protrusions, said second electric terminal being arranged so that said elastic arm portion presses against said second face of said PTC thermistor, and
   an abutment element within said insulating casing and placed between said protrusions in a proximal position with respect to one of said protrusions at a determinate distance from the first face of the PTC thermistor.

2. The PTC thermistor switch for electric motors according to claim 1, wherein the distance between the abutment element and the elastic arm portion in a rest position is less than or equal to the thickness of the PTC thermistor.

3. The PTC thermistor switch for electric motors according to claim 1, wherein the contact point of said elastic arm portion with said second face of said PTC thermistor is substantially at the center of said second face.

4. The PTC thermistor switch for electric motors according to claim 1, wherein the contact points of said protrusions with said first face of said PTC thermistor are substantially symmetrical with respect to the center of said first face.

5. The PTC thermistor switch for electric motors according to claim 1, wherein said protrusions are at the same distance from a bottom wall of said casing parallel to them.

6. The PTC thermistor switch for electric motors according to claim 1, wherein said housing seat has a collection area intended for collecting falling fragments of the PTC thermistor during breakage or crushing, said insulating casing presenting an insulating protective wall which extends into the collection area so as to cover the portion of the second electrical terminal facing said collection area.

* * * * *